United States Patent
Nakano et al.

(10) Patent No.: US 9,505,221 B2
(45) Date of Patent: Nov. 29, 2016

(54) INK JET RECORDING METHOD AND INK JET RECORDING APPARATUS

(71) Applicant: Seiko Epson Corporation, Tokyo (JP)

(72) Inventors: Keitaro Nakano, Matsumoto (JP); Mitsuaki Yoshizawa, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 117 days.

(21) Appl. No.: 14/227,145

(22) Filed: Mar. 27, 2014

(65) Prior Publication Data
US 2014/0292962 A1 Oct. 2, 2014

(30) Foreign Application Priority Data

Mar. 29, 2013 (JP) ................... 2013-071599
May 13, 2013 (JP) ................... 2013-100997
Aug. 17, 2013 (JP) ................... 2013-169299

(51) Int. Cl.
| | |
|---|---|
| *B41J 2/175* | (2006.01) |
| *B41J 2/18* | (2006.01) |
| *B41J 2/19* | (2006.01) |
| *C09D 11/101* | (2014.01) |
| *C09D 11/322* | (2014.01) |
| *B41M 5/00* | (2006.01) |
| *B41M 7/00* | (2006.01) |

(52) U.S. Cl.
CPC ....... *B41J 2/175* (2013.01); *B41J 2/18* (2013.01); *B41J 2/19* (2013.01); *C09D 11/101* (2013.01); *C09D 11/322* (2013.01); *B41J 2202/12* (2013.01); *B41M 5/0047* (2013.01); *B41M 5/0064* (2013.01); *B41M 7/0081* (2013.01)

(58) Field of Classification Search
CPC ........ B41J 2/175; B41J 2/211; B41J 2/2107; B41J 2/18; B41J 2/195; B41J 2/19; B41J 2202/12; C09D 11/101

USPC .......................... 347/95, 100, 96, 94, 89, 92
See application file for complete search history.

(56) References Cited

U.S. PATENT DOCUMENTS

2007/0229612 A1   10/2007 Oyanagi et al.
2013/0002773 A1*  1/2013 Fujii ................... C09D 11/101
                                                   347/86

FOREIGN PATENT DOCUMENTS

| JP | 2007-045936 A | 2/2007 |
|---|---|---|
| JP | 2007-283753 A | 11/2007 |
| JP | 2012-255072 A | 12/2012 |

OTHER PUBLICATIONS

BYK Additives and Instruments, Technical Information L-Dl 1, "Defoamers and Air Release Additives," dated Jan. 2008.

* cited by examiner

*Primary Examiner* — Henok Legesse
(74) *Attorney, Agent, or Firm* — Nutter McClennen & Fish LLP; John J. Penny, Jr.; Alex Nagorniy (57) ABSTRACT

An ink jet recording method includes delivering a non-aqueous light-curable ink composition stored in an ink container from the ink container to a head via an ink delivery path and discharging the ink composition from the head toward a recording medium. The non-aqueous light-curable ink composition contains a radically-polymerizable compound and has a surface tension of 25 mN/m or less. The non-aqueous light-curable ink composition stored in the ink container has a dissolved air content of 7 ppm or more. The non-aqueous light-curable ink composition has a dissolved air content of 30 ppm or less at delivery from the ink delivery path to the head.

20 Claims, 4 Drawing Sheets

INK JET RECORDING METHOD AND INK JET RECORDING APPARATUS

BACKGROUND

1. Technical Field

The present invention relates to an ink jet recording method and an ink jet recording apparatus.

2. Related Art

Ink jet recording methods allow the user to record high-definition images with relatively simple equipment and have been rapidly advancing in various fields. For example, JP-A-2007-45936, intended to provide an ink composition for ink jet that has excellent image uniformity (a reduced difference in luster between an image area and a non-image area), sharpness (edge sharpness), and bleed resistance with improved adhesion resistance, discloses an ink for ink jet that contains at least a coloring agent, water, and a polymer that has side chains on a hydrophilic backbone and forms cross-links between the side chains when irradiated with active energy radiation, wherein the surface tension of the ink composition for ink jet is in the range of 19 mN/m to less than 35 mN/m.

According to JP-A-2007-45936, the dissolved oxygen level of the ink for ink jet is preferably 2 ppm or less, and a dissolved oxygen level in the ink for ink jet exceeding 2 ppm makes poor ejection more likely to occur because of cavitation during discharge of the ink.

However, simply reducing the dissolved oxygen content of an ink for ink jet leads to poor storage stability of the ink composition in an ink jet recording apparatus. This also applies to simply reducing the dissolved nitrogen content. However, discharging an ink composition that has a high dissolved air content from a head continuously for a long period of time causes ejection failure at a nozzle, leading to poor discharge stability.

SUMMARY

An advantage of some aspects of the invention is that these aspects of the invention provide an ink jet recording method and an ink jet recording apparatus that achieve excellent discharge stability and storage stability.

The inventors conducted extensive research to solve the above problems. As a result, the inventors found that the above problems can be solved by adjusting the dissolved air content of an ink composition in an ink container, the dissolved air content of a discharged ink composition, and the surface tension to certain values, and completed the invention.

More specifically, some aspects of the invention are as follows.

1. An ink jet recording method includes delivering a non-aqueous light-curable ink composition stored in an ink container to a head via an ink delivery path and discharging the ink composition from the head toward a recording medium. The non-aqueous light-curable ink composition contains a radically-polymerizable compound and has a surface tension of 25 mN/m or less. The non-aqueous light-curable ink composition stored in the ink container has a dissolved air content of 7 ppm or more. The non-aqueous light-curable ink composition has a dissolved air content of 30 ppm or less at delivery from the ink delivery path to the head.

2. In the ink jet recording method according to 1, the non-aqueous light-curable ink composition may further contain at least one photopolymerization initiator selected from the group consisting of a thioxanthone compound and an acylphosphine oxide compound.

3. In the ink jet recording method according to 1 or 2, the head may have a pressure chamber configured to apply pressure to the non-aqueous light-curable ink composition and a stepped portion downstream of the pressure chamber.

4. In the ink jet recording method according to any one of 1 to 3, the dissolved air content of the non-aqueous light-curable ink composition stored in the ink container may be in the range of 7 to 25 ppm, and the dissolved air content of the non-aqueous light-curable ink composition at delivery from the ink delivery path to the head may be in the range of 7 to 30 ppm.

5. In the ink jet recording method according to any one of 1 to 4, the viscosity of the non-aqueous light-curable ink composition at 20° C. may be in the range of 8 to 40 mPa·s.

6. In the ink jet recording method according to any one of 1 to 5, the non-aqueous light-curable ink composition may contain an inorganic white pigment.

7. In the ink jet recording method according to any one of 1 to 6, the flow rate of the non-aqueous light-curable ink composition in the ink delivery path may be 5 m/min or more at delivery of the non-aqueous light-curable ink composition stored in the ink container to the head via the ink delivery path.

8. In the ink jet recording method according to any one of 1 to 7, the ink delivery path may have no degassing mechanism.

9. In the ink jet recording method according to any one of 1 to 8, the ink delivery path may have a circulating mechanism.

10. In the ink jet recording method according to any one of 1 to 9, a tube pump may be used to deliver the non-aqueous light-curable ink composition to the head.

11. In the ink jet recording method according to any one of 1 to 10, when initial loading of the ink delivery path is carried out with ink, the volume of the ink drained from the head during the initial loading may be 50 mL or less.

12. In the ink jet recording method according to any one of 1 to 11, the difference between the dissolved air content of the non-aqueous light-curable ink composition stored in the ink container and the dissolved air content of the non-aqueous light-curable ink composition at delivery from the ink delivery path to the head 12 hours after movement of the ink from the ink container to the ink delivery path (the latter minus the former) may be 10 ppm or less.

13. An ink jet recording apparatus performs recording by the ink jet recording method according to any one of 1 to 12.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following describes an embodiment of the invention (hereinafter referred to as "this embodiment") in detail while referring to the drawings as necessary. No aspect of the invention is limited to this embodiment, and various modifications can be made without departing from the scope of that aspect of the invention. Like numbers in the drawings reference like elements, and duplicate descriptions are omitted. The positional relationships such as above, below, left, and right are based on the positional relationships illustrated in the drawings unless otherwise specified. The ratios between dimensions in the drawings are not limited to the illustrated ratios.

Ink Jet Recording Method

An ink jet recording method according to this embodiment is an ink jet recording method that includes delivering a non-aqueous light-curable ink composition stored in an ink container (hereinafter also simply referred to as "the ink composition") to a head via an ink delivery path and discharging the ink composition from the head toward a recording medium. The non-aqueous light-curable ink composition contains a radically-polymerizable compound and has a surface tension of 25 mN/m or less. The non-aqueous light-curable ink composition stored in the ink container has a dissolved air content of 7 ppm or more. The non-aqueous light-curable ink composition has a dissolved air content of 30 ppm or less at discharge from the head.

Non-Aqueous Light-Curable Ink Composition

The ink jet recording method according to this embodiment uses a non-aqueous light-curable ink composition. By using a non-aqueous light-curable ink composition, the ink jet recording method does not need drying water or other volatile solvents and thus offers an excellent printing speed.

Surface Tension

The non-aqueous light-curable ink composition has a surface tension of 25 mN/m or less, preferably 23 mN/m or less, more preferably 22 mN/m or less. With a surface tension of 25 mN/m or less, the ink composition has better discharge stability than others because of reduced risk of bubbles remaining on the inner wall of the ink delivery path during initial loading. The surface tension has no specified lower limit. However, the lower limit is preferably 10 mN/m or more, more preferably 15 mN/m or more, even more preferably 17 mN/m or more. When the lower limit is in these ranges, the ink composition may have better discharge stability than in other cases. The surface tension can be measured by the method described in Examples.

Dissolved Air Content of the Non-Aqueous Light-Curable Ink Composition Stored in the Ink Container The non-aqueous light-curable ink composition stored in the ink container has a dissolved air content of 7 ppm or more, preferably 10 ppm or more, more preferably 15 ppm or more. When the dissolved air content of the stored ink composition is equal to or more than these ranges, polymerization of the polymerizable compound during storage is effectively prevented, which enhances the storage stability of the ink composition. No particular upper limit is specified. However, the upper limit is preferably 40 ppm or less, more preferably 30 ppm or less, even more preferably 25 ppm or less. The ink composition tends to have excellent stability with regard to dissolved air content upon ink preparation when the upper limit of the dissolved air content of the stored ink composition is equal to or lower than these ranges. When the recording apparatus has no degassing mechanism, it is preferred that the dissolved air content of the stored ink composition be 30 ppm or less. Given that the dissolved air content increases in the recording apparatus and from the viewpoint of enhancing discharge stability, it is preferred that the dissolved air content of the stored ink composition be in the range of 7 to 25 ppm, more preferably 7 to 15 ppm. From the viewpoint of enhancing storage stability and ensuring excellent stability with regard to dissolved air content, it is preferred that the dissolved air content of the stored ink composition be in the range of 15 to 25 ppm.

In this embodiment, the dissolved air content of the ink compositions (the ink composition stored in the ink container and the ink composition discharged from the head) is the total of the dissolved oxygen content and the dissolved nitrogen content. The dissolved air content of the ink compositions can be measured by the method described in Examples.

The ratio of the dissolved oxygen content to the dissolved nitrogen content associated with the dissolved air content of the ink composition stored in the ink tends to be in the range of (10:90) to (35:65), in particular (20:80) to (35:65), in the form of (dissolved oxygen content:dissolved nitrogen content) on a volume basis, when the ink is prepared in the air or the ink is degassed under reduced pressure in the air during preparation. In this case, advantageously, preparation of the ink becomes easier.

The ink composition in this embodiment has excellent discharge stability and can be suitably used with an ink jet recording apparatus. The dissolved air content of the ink composition discharged from the head, described below, can be higher than that of the ink composition stored in the ink container because air is dissolved in the ink while the ink composition passes through the ink flow channel in the ink jet recording apparatus.

Dissolved Air Content of the Non-Aqueous Light-Curable Ink Composition Discharged from the Head The non-aqueous light-curable ink composition discharged from the head has a dissolved air content of 30 ppm or less, preferably 25 ppm or less. When the upper limit of the air content is equal to or less than these ranges, the ink composition tends to have excellent discharge stability because it is unlike that bubbles left in the ink delivery path or elsewhere gradually move into the head during recording and cause ejection failure at a nozzle in the head. The dissolved air content of the discharged ink composition has no specified lower limit. However, the lower limit is preferably 7 ppm or more, more preferably 15 ppm or more, even more preferably 20 ppm of more. A lower limit of the total content in these ranges can be achieved even when the recording apparatus has no degassing device and is advantageous from the viewpoint of reducing the cost for the recording apparatus. With these issues in consideration, it is preferred that the dissolved air content of the discharged ink composition be in the range of 7 to 30 ppm, more preferably 7 to 25 ppm, even more preferably 15 to 25 ppm. The dissolved air content of the non-aqueous light-curable ink composition discharged from the head can be measured by the method described in Examples.

The dissolved air content of the non-aqueous light-curable ink composition at delivery from the ink delivery path to the head can be measured by sampling the non-aqueous light-curable ink composition at a point in the ink delivery path just short of the joint with the head as in Examples. The measured dissolved air content can therefore be described as the dissolved air content of the non-aqueous light-curable ink composition existing at the end of the ink delivery path on the head side. During continuous recording, the non-aqueous light-curable ink composition delivered to the head is discharged from the head without staying, and the dissolved air content probably remains unchanged in the head. During recording, therefore, the dissolved air content of the non-aqueous light-curable ink composition at delivery to the head via the ink delivery path can be regarded as the dissolved air content of the ink composition discharged from the head. The ink can also be sampled by a method other than that described in Examples as long as the measured dissolved air content is equivalent to that of the non-aqueous light-curable ink composition at delivery from the ink delivery path to the head. For example, the ink may be sampled in the head.

When the recording apparatus has no device that would increase and decrease only one of the dissolved oxygen and the dissolved nitrogen in the ink composition, the ratio of the dissolved oxygen content to the dissolved nitrogen content in the ink composition discharged from the head is equal to the ratio of the dissolved oxygen content to the dissolved nitrogen content of the ink composition stored in the ink container described above.

The dissolved air content of the ink composition in an ink jet recording apparatus increases because air permeates through a component of the ink delivery path and is dissolved in the ink, air permeates through a component of the ink container and is dissolved in the ink, and so forth. Furthermore, the dissolved air content may be unstable when the ink composition is prepared on a large scale. The quantity of such dissolved air discharged from the head can be controlled by adjusting the dissolved air content of the ink composition stored in the ink container.

Viscosity

The viscosity of the non-aqueous light-curable ink composition at 20° C. is preferably 40 mPa·s or less, more preferably 30 mPa·s or less, even more preferably 25 mPa·s or less, in particular 15 mPa·s or less. The lower limit of the viscosity at 20° C. is preferably 8 mPa·s or more. When the viscosity at 20° C. is equal to or less than the above ranges, the ink composition tends to have excellent discharge stability and be more unlikely to leave bubbles during initial loading than in other cases. When the lower limit of the viscosity at 20° C. is equal to or more than the above range, the ink composition tends to be cured with less creasing than in other cases.

Radically-Polymerizable Compound

The ink composition according to this embodiment contains a radically-polymerizable compound (i.e., a compound that can be polymerized by free-radical polymerization). Specific examples of such radically-polymerizable compounds include, but are not limited to, known monofunctional, bifunctional, and multifunctional (having three or more functional groups) monomers and oligomers. One or a combination of two or more polymerizable compounds can be used. The following presents examples of these polymerizable compounds.

Examples of monofunctional, bifunctional, and multifunctional (having three of more functional groups) monomers include, but are not limited to, the following: unsaturated carboxylic acids such as (meth)acrylic acid, itaconic acid, crotonic acid, isocrotonic acid, and maleic acid; salts of such unsaturated carboxylic acids; esters, urethanes, amides, and anhydrides derived from such unsaturated carboxylic acids; acrylonitrile, styrene, and various unsaturated polyesters, unsaturated polyethers, unsaturated polyamides, and unsaturated urethanes. Examples of monofunctional, bifunctional, and multifunctional (having three or more functional groups) oligomers include oligomers made up of the monomers listed above, such as linear acrylic oligomers, and epoxy (meth)acrylate, oxetane (meth)acrylate, aliphatic urethane (meth)acrylates, aromatic urethane (meth)acrylates, and polyester (meth)acrylates.

Other monofunctional monomers and multifunctional monomers may include N-vinyl compounds. Examples of N-vinyl compounds include, but are not limited to, N-vinylformamide, N-vinylcarbazole, N-vinylacetamide, N-vinylpyrrolidone, N-vinylcaprolactam, acryloyl morpholine, and their derivatives. In particular, esters of (meth)acrylic acid, i.e., (meth)acrylates, are preferred.

Within polymerizable compounds, esters of (meth)acrylic acid, i.e., (meth)acrylates, are preferred.

Examples of monofunctional (meth)acrylates include, but are not limited to, isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butyl cyclohexyl (meth)acrylate, dicyclopentanyl (meth)acrylate, and dicyclopentenyloxyethyl (meth)acrylate. In particular, phenoxyethyl (meth)acrylate is preferred.

The quantity of such a monofunctional (meth)acrylate is preferably in the range of 30% to 85% by mass, more preferably 40% to 75% by mass, based on the total mass (100% by mass) of the ink composition. When the quantity of such a monofunctional (meth)acrylate is in these preferred ranges, the ink composition tends to be better in terms of curability, dissolution of an initiator, storage stability, and discharge stability than in other cases.

Monofunctional (meth)acrylates that contain a vinyl ether group are also included. Examples of monofunctional (meth)acrylates of this type include, but are not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxy)ethyl (meth)acrylate, 2-(isopropenoxyethoxyethoxyethoxy)ethyl (meth) acrylate, polyethylene glycol monovinyl ether (meth)acrylate and polypropylene glycol monovinyl ether (meth)acrylate, phenoxyethyl (meth)acrylate, isobornyl (meth)acrylate, and benzyl (meth)acrylate. In particular, 2-(vinyloxyethoxy) ethyl (meth)acrylate, phenoxyethyl (meth)acrylate, isobornyl (meth)acrylate, and benzyl (meth)acrylate are preferred.

In particular, 2-(vinyloxyethoxy)ethyl (meth)acrylate, i.e., at least one of 2-(vinyloxyethoxy)ethyl acrylate and 2-(vinyloxyethoxy)ethyl methacrylate, is preferred because these compounds further reduce the viscosity of the ink, have a high ignition point, and provide the ink with excellent curability, and 2-(vinyloxyethoxy)ethyl acrylate is more preferred. Having a simple structure and a small molecular weight, both 2-(vinyloxyethoxy)ethyl acrylate and 2-(vinyloxyethoxy)ethyl methacrylate significantly reduce the viscosity of the ink. Examples of 2-(vinyloxyethoxy)ethyl (meth)acrylate include 2-(2-vinyloxyethoxy)ethyl (meth) acrylate and 2-(1-vinyloxyethoxy)ethyl (meth)acrylate, and examples of 2-(vinyloxyethoxy)ethyl acrylate include 2-(2-vinyloxyethoxy)ethyl acrylate and 2-(1-vinyloxyethoxy) ethyl acrylate. In addition, 2-(vinyloxyethoxy)ethyl acrylate is better than 2-(vinyloxyethoxy)ethyl methacrylate in terms of curability.

The quantity of such a vinyl-ether-containing (meth) acrylate, in particular, 2-(vinyloxyethoxy)ethyl (meth)acrylate, is preferably in the range of 10% to 70% by mass, more preferably 30% to 50% by mass, based on the total mass (100% by mass) of the ink composition. Such a (meth) acrylate reduces the viscosity of the ink and enhances the curability of the ink when the quantity thereof is 10% by mass or more. Furthermore, such a (meth)acrylate does not affect the excellent storage stability of the ink as long as the quantity thereof is 70% by mass or less.

Examples of bifunctional (meth)acrylates, within (meth) acrylates, include triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A EO (ethylene oxide) adduct di(meth)acrylate, bisphenol A PO (propylene oxide) adduct di(meth)acrylate, hydroxypivalic acid neopentyl glycol di(meth)acrylate, polytetramethylene glycol di(meth) acrylate, diethylene glycol di(meth)acrylate, triethylene glycol di(meth)acrylate, and (meth)acrylates that have a pentaerythritol skeleton or a dipentaerythritol skeleton and three or more functional groups. Dipropylene glycol di(meth)acrylate is preferred, and dipropylene glycol di(meth) acrylate, tripropylene glycol di(meth)acrylate, diethylene glycol di(meth)acrylate, triethylene glycol di(meth)acrylate, and (meth)acrylates that have a pentaerythritol skeleton or a dipentaerythritol skeleton and three or more functional groups are particularly preferred. It is more preferred that the ink composition contain a multifunctional (meth)acrylate in addition to a monofunctional (meth)acrylate.

The quantity of such a multifunctional (meth)acrylate having two or more functional groups is preferably in the range of 5% to 60% by mass, more preferably 15% to 60% by mass, even more preferably 20% to 50% by mass, based on the total mass (100% by mass) of the ink composition. When the quantity of such a multifunctional (meth)acrylate having two or more functional groups is in these preferred ranges, the ink composition tends to be better in terms of curability, storage stability, and discharge stability than in other cases.

Examples of multifunctional (meth)acrylates having three or more functional groups, within (meth)acrylates, include trimethylolpropane tri(meth)acrylate, EO-modified trimethylolpropane tri (meth)acrylate, pentaerythritol tri(meth) acrylate, pentaerythritol tetra(meth)acrylate, dipentaerythritol hexa(meth)acrylate, ditrimethylolpropane tetra(meth) acrylate, glycerol propoxy tri(meth)acrylate, caprolactone-modified trimethylolpropane tri(meth)acrylate, pentaerythritol ethoxy tetra(meth)acrylate, and caprolactam-modified dipentaerythritol hexa(meth)acrylate.

Preferably, the ink composition contains a monofunctional (meth)acrylate, in particular, as a polymerizable compound. This provides the ink composition with a low viscosity and allows additives such as a photopolymerization initiator to be highly soluble in the ink composition, as well as ensuring that discharge stability can be easily achieved during ink jet recording. It is more preferred to use a monofunctional (meth)acrylate and a bifunctional (meth) acrylate in combination, even more preferably phenoxyethyl (meth)acrylate and dipropylene glycol di(meth)acrylate in combination, because this improves the toughness, heat resistance, and chemical resistance of coatings.

The quantity of the radically-polymerizable compound is preferably 97% by mass or less, more preferably 50% to 95% by mass, even more preferably 60% to 95% by mass, based on the total mass (100% by mass) of the ink composition. When the quantity of the radically-polymerizable compound is in these ranges, the ink composition tends to be better in terms of curability and the abrasion resistance and adhesion of cured material.

Photopolymerization Initiator

The ink composition used in this embodiment may contain a photopolymerization initiator. The use of ultraviolet radiation (UV) ensures that the ink composition is extremely safe and can be used with reduced cost for a light-source lamp, compared to the use of other kinds of radiation. Thus, such a photopolymerization initiator is preferably a radical-photopolymerization initiator, which forms a radical species and initiates polymerization of the polymerizable compound in response to energy of light (ultraviolet radiation).

The ink composition preferably contains, for example, at least one photopolymerization initiator selected from the group consisting of a thioxanthone compound and an acylphosphine oxide compound, although preferred photopolymerization initiators are not limited to these. The ink composition tends to exhibit good curability upon irradiation with an LED when containing a thioxanthone compound or an acylphosphine oxide compound. Although discharge stability can be affected when the ink composition contains these compounds, the ink jet recording method according to this embodiment would be a recording method that achieves excellent discharge stability. This means that the ink jet recording method according to this embodiment is particularly advantageous when the ink composition contains these compounds. The poor stability of discharge from the head associated with the use of a thioxanthone compound or an acylphosphine oxide compound is presumably because fine particles of the compound existing in the ink composition serve as bubble cores that help the oxygen dissolved in the ink composition to appear as bubbles during storage of the ink composition. However, this is just a presumption, and the cause is not limited to this.

Thioxanthone Compound

A thioxanthone compound can be used in order for the ink composition existing on the recording medium to cure and form a print through photopolymerization initiated by irradiation with ultraviolet light. Adding a thioxanthone compound improves the curability of the ink composition. The use of ultraviolet radiation (UV) further reduces the cost for a light-source lamp as well as ensuring extreme safety, compared to the use of other kinds of radiation. The quantity of such a thioxanthone compound is preferably in the range of 0.3% to 3% by mass, relative to the ink.

Specifically, the ink composition preferably contains one or more thioxanthone compounds selected from the group consisting of thioxanthone, diethylthioxanthone represented by 2,4-diethylthioxanthone, isopropylthioxanthone represented by 2-isopropylthioxanthone, and chlorothioxanthone represented by 2-chlorothioxanthone, although preferred thioxanthone compounds are not limited to these. Diethylthioxanthone is preferred in particular. Adding diethylthioxanthone tends to make it more efficient to convert a wide range of ultraviolet light (UV light) into a radical species.

Acylphosphine Oxide Compound

An acylphosphine oxide compound tends to make the ink composition better in terms of UV-LED-induced curing processes and enhance the curability of the ink composition when used in combination with a thioxanthone compound.

Specific examples of acylphosphine oxide compounds include, but are not limited to, bis(2,4,6-trimethylbenzoyl)-phenylphosphine oxide, 2,4,6-trimethylbenzoyl diphenyl-phosphine oxide, and bis(2,6-dimethoxybenzoyl)-2,4,4-trimethylpentylphosphine oxide. The quantity of such an acylphosphine oxide compound is preferably in the range of 3% to 17% by mass, more preferably 5% to 13% by mass, relative to the ink.

Other Radical-Photopolymerization Initiators

Examples of other radical-photopolymerization initiators include, but are not limited to, aromatic ketones, aromatic onium salt compounds, organic peroxides, thio compounds (e.g., compounds that contain a thiophenyl group), α-aminoalkylphenone compounds, hexaarylbiimidazoles compounds, ketoxime ester compounds, borate compounds, azinium compounds, metallocenes compounds, active ester compounds, compounds that have a carbon-halogen bond, and alkylamine compounds.

The quantity of such a photopolymerization initiator is preferably in the range of 3% to 20% by mass, more preferably 5% to 15% by mass, even more preferably 7% to 13% by mass, based on the total mass (100% by mass) of the ink. When the quantity of such a photopolymerization initiator is equal to or more than these ranges, the curability of the ink composition tends to be better than in other cases. When the quantity of such a photopolymerization initiator is equal to or less than these ranges, discharge stability tends to be better than in other cases.

Coloring Material

The ink composition according to this embodiment may contain coloring material. Such coloring material can be either or both of pigment and dye.

Pigment

The use of pigment as coloring material improves the light resistance of the ink composition. Such pigment can be an inorganic pigment or an organic pigment.

In particular, an inorganic white pigment is preferred. The use of an inorganic white pigment generally tends to cause poor stability of discharge from the head, and thus in such a case the ink jet recording method according to this embodiment is particularly effective. The poor stability of discharge from the head associated with the use of an inorganic white pigment is presumably because fine particles of the inorganic white pigment existing in the ink composition serve as bubble cores that help the oxygen dissolved in the ink composition to appear as bubbles during storage of the ink composition. However, this is just a presumption, and the cause is not limited to this. The fact that inorganic white pigments generally contain a large quantity of pigment can be another possible cause.

Examples of inorganic white pigments include, but are not limited to, metal oxides, metal carbonates, metal sulfates, and metal silicates such as titanium oxide, calcium carbonate, barium sulfate, silicon oxide, calcium silicate, aluminum oxide, zinc oxide, cerium oxide, talc, and clay, and metal oxides are preferred because of the easy availability thereof.

Examples of other inorganic pigments include, but are not limited to, carbon blacks (C.I. Pigment Black 7) such as furnace black, lamp black, acetylene black, and channel black and iron oxide.

Examples of organic pigments include, but are not limited to, azo pigments such as insoluble azo pigments, condensed azo pigments, azo lakes, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates (e.g., basic-dye chelates and acid-dye chelates), dye lakes (basic-dye lakes and acid-dye lakes), nitro pigments, nitroso pigments, aniline black, and daylight fluorescent pigments.

More specifically, examples of carbon blacks for black ink include No. 2300, No. 900, MCF88, No. 33, No. 40, No. 45, No. 52, MA7, MA8, MA100, and No. 2200B (Mitsubishi Chemical Corporation), Raven 5750, Raven 5250, Raven 5000, Raven 3500, Raven 1255, and Raven 700 (Carbon Columbia), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (CABOT JAPAN K.K.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (Degussa).

Examples of pigments for white ink include C.I. Pigment White 6, 18, and 21.

Examples of pigments for yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of pigments for magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245 and C.I. Pigment Violet 19, 23, 32, 33, 36, 38, 43, and 50.

Examples of pigments for cyan ink include C.I. Pigment Blue 1, 2, 3, 15, 15:1, 15:2, 15:3, 15:34, 15:4, 16, 18, 22, 25, 60, 65, and 66 and C.I. Vat Blue 4 and 60.

Examples of pigments other than magenta, cyan, and yellow pigments include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

One or a combination of two or more of such pigments can be used.

When pigment is used, the average particle diameter thereof is preferably 300 nm or less, more preferably in the range of 50 to 200 nm. When having an average particle diameter in these ranges, the pigment has better reliability in the ink composition, such as discharge stability and dispersion stability, than in other cases and also forms images with excellent quality. The average particle diameter mentioned herein is measured by dynamic light scattering. When an inorganic white pigment is used, it is preferred that the average particle diameter thereof be in the range of 100 nm to 1 µm, more preferably 200 to 400 nm, even more preferably 200 to 300 nm, in respect of discharge stability and the whiteness of recordings.

Dye

Dye can be used as coloring material. Examples of dyes include, but are not limited to, acid dyes, direct dyes, reactive dyes, and basic dyes. Examples of such dyes include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

One or a combination of two or more of such dyes can be used.

The quantity of such coloring material is preferably in the range of 0.3% to 25% by mass based on the total mass (100% by mass) of the ink composition so that excellent masking properties and color reproducibility can be achieved. When the coloring material is a white pigment, it is more preferred that the quantity thereof be in the range of 10% to 25% by mass, even more preferably 15% to 23% by mass, in respect of discharge stability and the whiteness of recordings. When the coloring material is not a white pigment, it is more preferred that the quantity thereof be in the range of 0.5% to 10% by mass, even more preferably 0.5% to 5% by mass, in respect to discharge stability and the color saturation of recordings.

Dispersant

When containing pigment, the ink composition may further contain a dispersant to make the pigment more dispersible. Examples of dispersants include, but are not limited to, dispersants commonly used to prepare liquid pigment dispersion, such as polymeric dispersants. Specific examples include dispersants mainly composed of one or more of polyoxyalkylene polyalkylene polyamines, vinyl polymers and copolymers, acrylic polymers and copolymers, polyesters, polyamides, polyurethanes, amino polymers, silicon-containing polymers, sulfur-containing polymers, fluorine-containing polymers, and epoxy resin. Examples of commercially available polymeric dispersants include AJISPER dispersants manufactured by Ajinomoto Fine-Techno, Solsperse dispersants (Solsperse 36000) available from Avecia and Noveon, DISPERBYK dispersants manufactured by BYK Chemie, and DISPARLON dispersants manufactured by Kusumoto Chemicals.

Other Additives

The ink composition may contain additives (components) other than those described above. Examples of such components may include, but are not limited to, known slipping agents (surfactants), polymerization accelerators, penetration enhancers, moisturizing agents (humectants), and other additives. Examples of the "other additives" include known fixatives, antimolds, preservatives, antioxidants, ultraviolet absorbents, chelators, pH-adjusting agents, and thickeners.

Ink Jet Recording Apparatus

The ink jet recording method according to this embodiment is an ink jet recording method that includes delivering an ink composition stored in an ink container to a head via an ink delivery path and discharging the ink composition from the head toward a recording medium. The following describes an ink jet recording apparatus that can be used in the ink jet recording method according to this embodiment.

An ink jet recording apparatus that can be used in the ink jet recording method according to this embodiment performs recording by this ink jet recording method. Examples of components an ink jet recording apparatus according to this embodiment can have include, but are not limited to, an ink container, an ink delivery path, and a head, all described below. The rest of the structure may be similar to that of a known ink jet recording apparatus. The following describes such an ink jet recording apparatus with reference to drawings.

Figure 1:
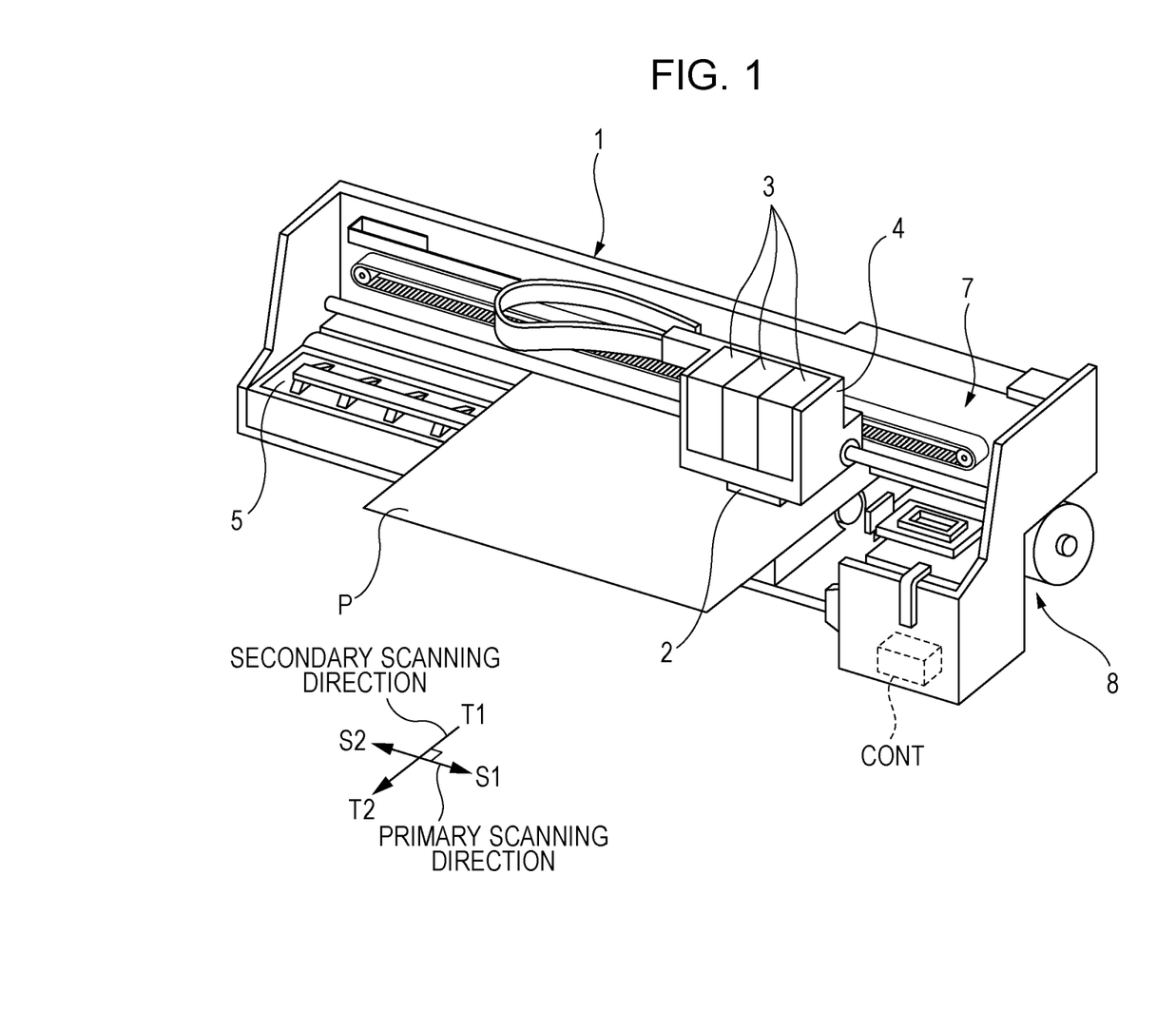
FIG. 1 is a perspective view of a printer according to this embodiment.

FIG. 1 is a perspective view that illustrates an example of the structure of a printer 1 used in this embodiment. The printer 1 illustrated in FIG. 1 is a serial printer. A serial printer is a printing apparatus that has a head on a carriage configured to move in a predetermined direction and discharges droplets toward a recording medium as the head moves with movement of the carriage.

As illustrated in FIG. 1, the printer 1 has a carriage 4 loaded with a head 2 and head devices 3, a platen 5 located under the head 2 and on which a recording medium P is transported, a carriage-moving mechanism 7 that moves the carriage 4 in a medium width direction of the recording medium P, and a medium-feeding mechanism 8 that feeds the recording medium P in a medium feeding direction. The printer 1 also has a control unit CONT that controls the operation of the entire printer 1. The medium width direction is the primary scanning direction (the direction in which the head 2 scans), and the medium feeding direction is the secondary scanning direction (the direction perpendicular to the primary scanning direction). The head devices 3 are devices that relate to the head 2, such as a head-driving circuit. The printer 1 is detachably equipped with an ink container, not illustrated, somewhere other than the carriage 4.

In the printer 1 illustrated in FIG. 1, a non-aqueous light-curable ink composition stored in the ink container is delivered from the ink container to the head 2 via an ink delivery path (not illustrated) and discharged from the head 2 toward the recording medium P.

The control unit CONT is capable of execution operations to control or coordinate the execution timing and other attributes of the operation of the aforementioned components such as the carriage 4, the head 2, the carriage-moving mechanism 7, and the medium-feeding mechanism 8.

Figure 2:
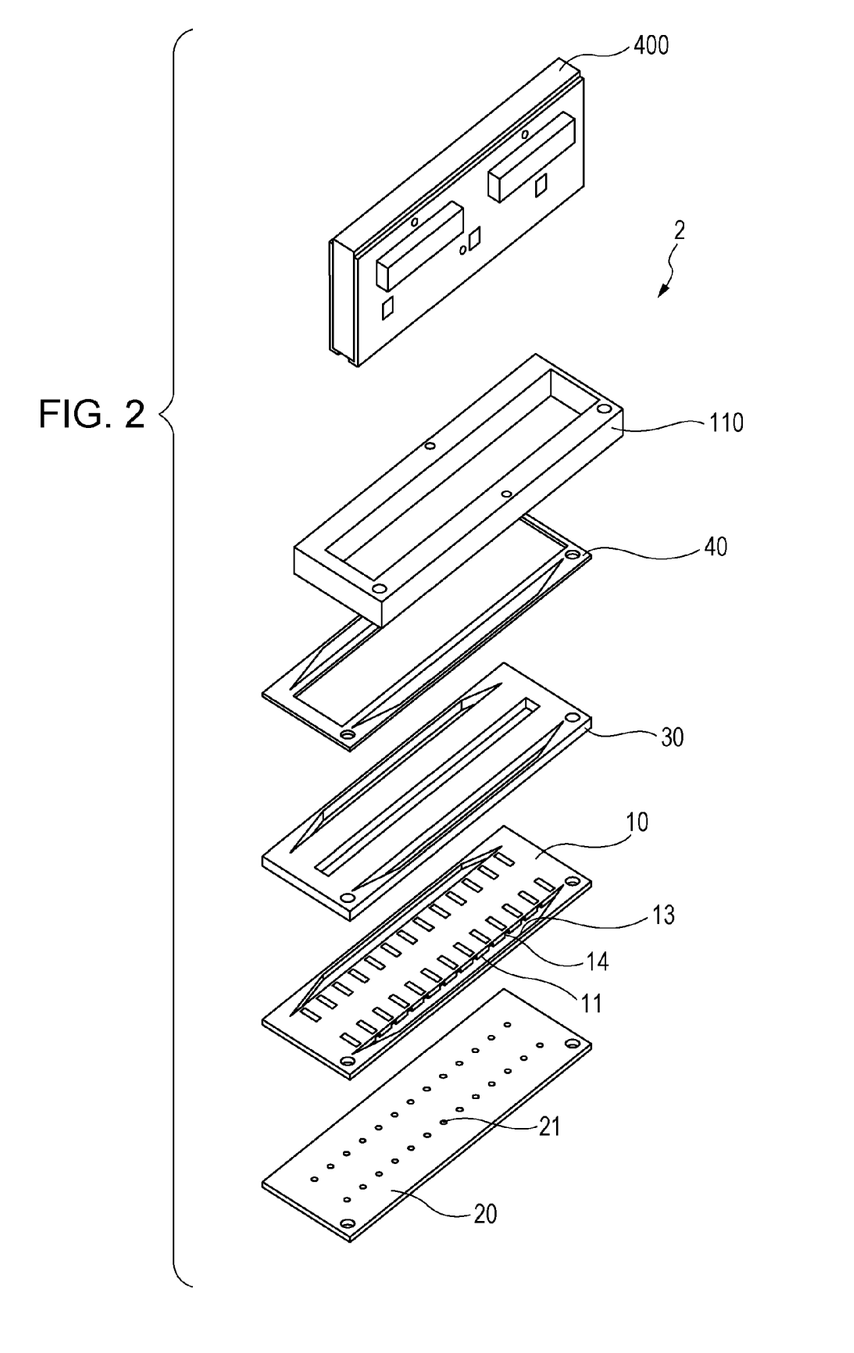
FIG. 2 is an exploded perspective view that schematically illustrates the structure of a head used in this embodiment.
Figure 3:
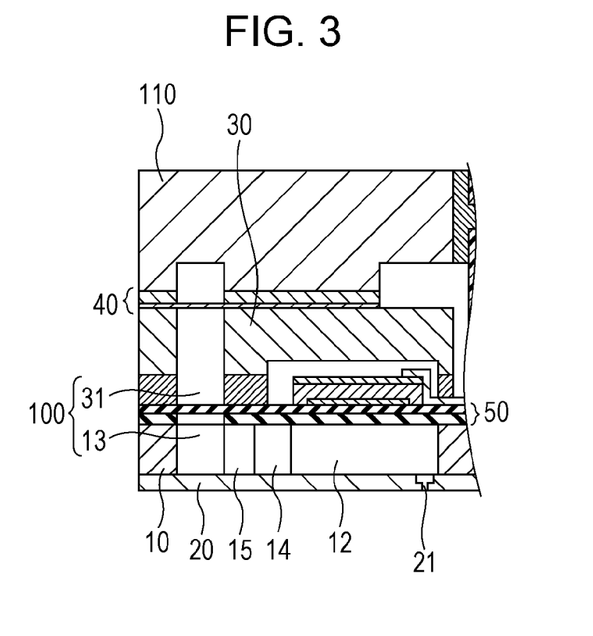
FIG. 3 is a partial cross-sectional view that schematically illustrates the internal structure of a head used in this embodiment.
Figure 4:
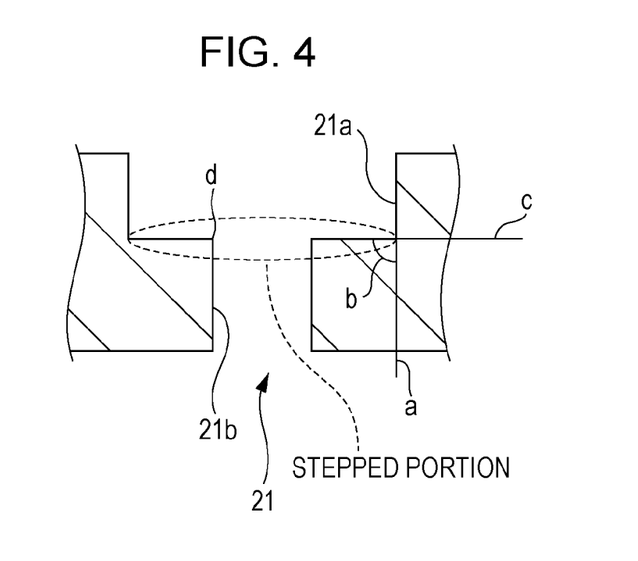
FIG. 4 is an enlarged partial cross-sectional view of a nozzle of a head used in this embodiment.

FIG. 2 is an exploded perspective view that schematically illustrates an example of the structure of the head 2. FIG. 3 is a partial cross-sectional view that schematically illustrates an example of the internal structure of the head 2. FIG. 4 is an enlarged partial cross-sectional view of an example of a nozzle 21 provided in the head 2.

In the example structure illustrated in FIG. 2, the head 2 has a flow channel substrate 10, a nozzle plate 20, a protective substrate 30, a compliance substrate 40, a head case 110, and a plate-shaped member 400.

The flow channel substrate 10 is made from, for example, a single-crystal silicon substrate having a plane orientation of (110) in this embodiment and has an elastic film 50 made of silicon dioxide on either side thereof. The flow channel substrate 10 may be a material other than a single-crystal silicon substrate, such as a metal plate or a ceramic plate.

The flow channel substrate 10 has two rows of multiple pressure chambers 12 defined by walls 11 and arranged in the direction of the width of the pressure chambers 12. A communicating space 13 is created in a region located outside of each row of pressure chambers 12 in the longitudinal direction of the pressure chambers 12, and the communicating space 13 and each pressure chamber 12 communicate with each other via an ink introduction path 14 and a communicating path 15 provided for each pressure chamber 12. The communicating space 13 communicates with the reservoir portion 31 of the protective substrate 30 described below to make up a portion of a reservoir 100, i.e., a common ink reservoir for each row of pressure chambers 12. The ink introduction path 14 has a width smaller than that of the pressure chambers 12 and keeps the resistance of the flow channel to the ink that flows from the communicating space 13 into the pressure chambers 12.

To the opening side of the flow channel substrate 10, a nozzle plate 20 provided with nozzles 21 that communicate with the vicinity of the end portion of the respective pressure chambers 12 opposite the ink introduction path 14 is bonded by means such as an adhesive agent or hot-melt film. In this embodiment, the flow channel substrate 10 has two rows of arranged pressure chambers 12, and thus one head 2 has two nozzle rows each made up of arranged nozzles 21. The nozzle plate 20 is made from, for example, glass ceramic, a single-crystal silicon substrate, or stainless steel.

Preferably, the nozzle plate 20 is made of crystalline silicon, such as single-crystal silicon or polycrystalline silicon. It is more preferred that the nozzle plate 20 be made of single-crystal silicon. When a nozzle plate is made of crystalline silicon, the nozzle plate can be worked by known etching processes (e.g., wet etching and dry etching) with high precision, and in many cases nozzles are created by a combination of such processes. The nozzles can therefore be created with a higher density (e.g., a nozzle density of 300 dpi or more) in the case where a nozzle plate made of crystalline silicone is used than in the case where the nozzles are created by punching or similar techniques. In such a case, however, the resulting nozzles often have a stepped portion such as that described below.

To have enhanced performance in discharging droplets, the nozzles 21 are created in such a manner that the opening diameter thereof changes stepwise, i.e., created in a multi-step shape having two or more steps. For example, as illustrated in FIG. 4, the nozzles 21 have a large-diameter section 21a and a small-diameter section 21b that has an opening diameter smaller than that of the large-diameter section 21a. The large-diameter section 21a and the small-diameter section 21b are provided in this order (the large-diameter section 21a to the small-diameter section 21b) in the direction in which droplets of the ink composition are discharged.

Head

The non-aqueous light-curable ink composition is discharged to the recording medium P by means of a head 2. The head 2 can have a pressure chamber 12 configured to apply pressure to the non-aqueous light-curable ink composition and a stepped portion in the flow channel downstream of the pressure chamber 12.

Such a head 2 with a stepped portion is produced in the case where the head 2 has a stepped portion because of a problem associated with the manufacturing method, e.g., etching of a nozzle plate 20 to create a nozzle 21 leaving a stepped shape in the nozzle 21 as illustrated in FIG. 4, and in the case where a step is intentionally provided for a certain reason, e.g., to reduce the nozzle diameter stepwise in order to enhance the performance of the nozzle 21 in discharging the ink composition while reducing the resistance of the flow channel on the side of the nozzle 21 where the ink composition is discharged. The term "stepped portion" represents a portion where the cross-sectional area in the direction of ink movement changes stepwise. The place where such a stepped portion is located is not limited to a nozzle plate 20 and can be anywhere downstream of the pressure chamber 12. For example, when the head 2 has a passage between the pressure chamber 12 and a nozzle plate 20 through which the ink passes, the stepped portion can be located in this passage. Some advantages arise in this case. For example, the pressure chamber and the nozzle can be disposed with a certain distance therebetween.

The term "nozzle" represents a portion located on the downstream side with respect to a pressure chamber and extending to a nozzle opening, the pressure chamber configured to apply pressure to ink and discharge the ink composition through the nozzle opening, preferably representing a portion provided in a plate that has the nozzle opening (a nozzle plate).

Bubbles are particularly likely to remain at a corner or a stepped portion in the ink delivery path, and it is difficult to remove such bubbles even by flushing from the head or cleaning by drawing the ink composition. Presumably, such bubbles can gradually move into the head 2 and cause bubble-related poor discharge. The head 2 may have a step that forms in association with the manufacturing method in a nozzle 21. Presumably, bubbles are likely to remain on such a step, and such residual bubbles affect discharge stability by canceling the pressure in the pressure chamber 12 and weakening the discharge force, and cause poor discharge of the ink composition when discharged during printing. The ink jet recording method according to this embodiment is therefore particularly advantageous in such a case.

Such a stepped portion may be formed so that the cross-sectional area of the flow channel will be relatively small on the side of the nozzle where the ink composition is discharged (in the direction in which the ink moves) or that the cross-sectional area of the flow channel will be relatively large on that side of the nozzle. It is preferred that the cross-sectional area be smaller on the side of discharge than on the other side from the viewpoint of enhancing discharge performance.

When a stepped portion is formed in such a manner that the cross-sectional area of the flow channel in the direction of the flow channel in which the ink composition is discharged (the direction in which the ink moves) relatively changes (becomes smaller or larger), the stepped portion is preferably such that the angle of the joint between a portion having a certain cross-sectional area and another having a different cross-sectional area be 60° or more, preferably 70° or more, more preferably 80° or more. In FIG. 4, this angle is approximately 90°. The term "angle" refers to, in respect of a portion of the flow channel (the nozzle 21 in FIG. 4) where the cross-sectional area of the flow channel changes stepwise along the direction in which the ink composition moves (a stepped portion), an angle "b" formed by an imaginary flow channel ("a" in FIG. 4) obtained by extending a wall surface located on the upstream side in the direction in which the ink moves (the large-diameter section 21a in FIG. 4) to the downstream side with respect to the stepped portion and a wall surface ("c" in FIG. 4) that connects to the above wall surface on the upstream side in the stepped portion. The edge of the corner of the portion where the wall surface 21a and the wall surface "c" connect to each other may be rounded. In FIG. 4, the symbol "d" indicates a portion where the wall surface "c" and the small-diameter section 21b are connected.

There may be a plurality of portions where the cross-sectional area changes (stepped portions). The nozzle diameter at the outermost portion on the side of the nozzle where the ink composition is discharge (nozzle opening) is preferably in the range of 10 to 30 µm, more preferably 15 to 25 µm.

Ink Container

The ink container used in the ink jet recording method according to this embodiment can be of any type as long as the non-aqueous light-curable ink composition can be stored therein.

Examples of materials for the ink container include, but are not limited to, plastics such as polyethylene terephthalate (PET) and polypropylene (PP), metals (including alloys), and polyolefins such as polyethylene, ethylene-vinyl acetate copolymers, and polypropylene. In addition to these, it is possible to use a mixed polymer or a film or any other form of polymers obtained by mixing such polymers in appropriate proportions or stacking such polymers.

The oxygen permeability of the material of the ink container that makes contact with the ink composition (hereinafter simply referred to as "the oxygen permeability") is preferably 5.0 cc·20 µm/(m²·day·atm) or less, more preferably 2.0 cc·20 µm/(m²·day·atm) or less. When the oxygen permeability is in these ranges, the dissolved oxygen content of the stored ink composition tends to be unlikely to change. This material or member can be of any kind. For an ink pack, it is possible to process film into a bag by thermal bonding (heat sealing) and use the obtained bag. Examples of films for such an ink pack include films produced by drawing plastics such as high-density, low-density, or linear low-density polyethylene, polypropylene, ethylene-vinyl alcohol copolymers, and polystyrene. A multilayer film obtained by bonding multiple layers of film can also be used. Such an ink pack may be made from film alone if the aforementioned oxygen permeability can be achieved with the film. It is also possible to achieve appropriate oxygen permeability by placing a gas barrier layer on the film. Such a gas barrier layer may be a metal layer such as an aluminum layer or an inorganic oxide layer such as a silicon oxide or aluminum oxide layer, and may also be a laminate of those films that have a low oxygen permeability compared to the others listed above, such as ethylene-vinyl alcohol copolymers and polyvinyl alcohol. The total film thickness is preferably 50 µm or more, preferably 70 µm or more, more preferably 70 to 200 µm. Such a film thickness ensures that the dissolved oxygen content of the stored ink composition is unlikely to change and also provides the pack with strength and flexibility. In particular, films made from ethylene glycol copolymers are preferred because of the low oxygen permeability and excellent strength thereof. For containers other than a pack, examples of materials include other plastics, glass, and metals in addition to the materials listed above.

The oxygen permeability mentioned herein has a unit of cc·20 µm/(m²·day·atm), and the "atm" is a pressure (atm) measured under the conditions of 23° C. and 65% relative humidity. This oxygen permeability can be calculated by measuring the rate of permeation of oxygen that permeates through film (at the time when the relative humidity reaches a state of equilibrium) by the method set forth in ISO 14663-2:1999 (Annex C), i.e., by using a coulometric sensor.

Examples of forms of the ink container include, but are not limited to, a pack, a bottle, a tank, and a can. Among preferred forms are a pack, a bottle, and a tank because these forms of containers are commonly used and allow the oxygen permeability described below to be easily adjusted to a desired value. A pack is more preferred, and a pack made from film is particularly preferred.

Ink Delivery Path

The ink delivery path is a flow channel through which the ink composition stored in the ink container is delivered to the head 2. Preferably, the ink delivery path is a plastic tube or a tube made of any similar material because of the flexibility thereof. At delivery of the non-aqueous light-curable ink composition stored in the ink container from the ink container to the head 2 via the ink delivery path, the flow rate of the non-aqueous light-curable ink composition in the ink delivery path (distance in the ink delivery path per minute) is preferably 3 m/min or more, more preferably 4 m/min or more, even more preferably 5 m/min or more. This flow rate has no specified upper limit. However, the flow rate is preferably 15 m/min or less, more preferably 10 m/min or less. The recording speed can be enhanced by making this flow rate equal to or more than the above ranges. When the flow rate is equal to or less than the above ranges, discharge stability tends to be better than in other cases because any bubbles in the ink delivery path move slowly. This flow rate can be controlled by using a pump that forces the ink composition. The cross-sectional diameter of the ink delivery path is preferably in the range of 1 to 10 mm, more preferably 2 to 7 mm, although not limited to these.

Degassing Mechanism

The ink delivery path may have a degassing mechanism. When the ink delivery path has a degassing mechanism, the air dissolved in the ink in the recording apparatus can be decreased, but a degassing time may be needed before starting recording and, when the dissolved air content of the ink in the ink container is very high, it may be difficult to degas the ink sufficiently. When the ink delivery path has no degassing mechanism, the recording apparatus can be made simpler and the cost can be reduced, but discharge stability may be affected because the dissolved air content of the ink composition cannot be reduced in the recording apparatus. In such a case, therefore, the ink jet recording method according to this embodiment is particularly advantageous.

Circulating Mechanism

The ink delivery path preferably has a circulating mechanism. A circulating mechanism is a mechanism by which at least some of the ink delivered in the direction from the ink delivery path to the head is returned to the ink delivery path without being discharged from a nozzle. Providing the ink delivery path with a circulating mechanism is effective in preventing sedimentation of the components of the ink. In particular, when the ink composition contains an inorganic white pigment, it is preferred to provide the ink delivery path with an ink circulating mechanism to prevent sedimentation of the inorganic white pigment, and in such a case, bubbles also remain in the ink circulating mechanism in the ink delivery path. As a result, discharge stability, among other characteristics, tends to be worse than in other cases because of the increased volume of residual bubbles. The ink jet recording method according to this embodiment is also particularly advantageous in such a case.

Figure 5:
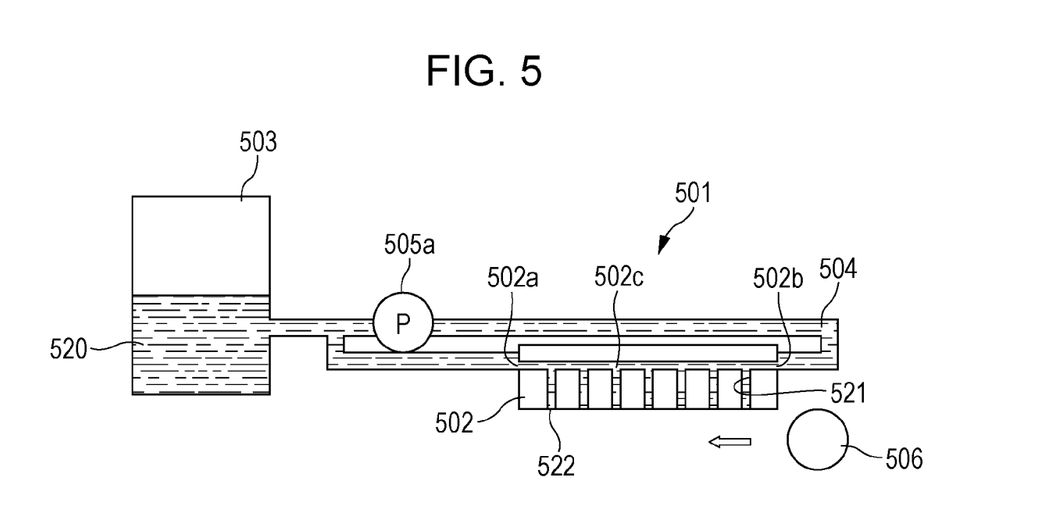
FIG. 5 is a schematic view that illustrates the structure of a circulating mechanism that may be used in this embodiment.

FIG. 5 is a schematic diagram that illustrates an example of the structure of an ink delivery path that has a circulating mechanism. An ink discharge apparatus 501 illustrated in FIG. 5 has a head 502, an ink tank 503 (the ink container), an ink flow channel 504, a pump 505a, a wiper 506, and a return flow channel (the flow channel to the left of the head 502 in the drawing) that circulates the ink by returning the ink from the head 502 to the ink flow channel 504. The head 502, a surface of which has openings 522 of a plurality of nozzles 521 for discharging an ink composition 520, discharges the ink composition 520 from the openings 522 of the nozzles 521 by extruding the ink composition 520 in the nozzles 521 by means such as a piezoelectric element. The head 502 also has an ink inlet 502b through which the ink composition 520 is introduced from the ink flow channel 504, an ink outlet 502a through which the ink composition 520 is ejected into the return flow channel, and an internal path 502c that connects the nozzles 521, the ink inlet 502b, and the ink outlet 502a.

An ink circulating path connects the ink inlet 502b and the ink outlet 502a of the head 502 with a tube so that the ink composition 520 can circulate. In FIG. 5, the ink flow channel 504, the internal path 502c of the head 502, and the return flow channel form a circular path, in which the ink composition 520 is circulated. Especially when the ink composition 520 contains a particulate component, such as metal particles, it is preferred to circulate the ink composition 520 in a circular path so that the particulate component of the ink composition 520 can be prevented from settling in the head 502 and aggregating. The ink circulating path 504 can be, for example, a tube having a diameter of 1 to 10 mm that can be made from silicone piping. The length of such a circulating path can be in the range of 800 mm to 10 m and can also be in the range of 1 to 9 m, in particular, 3 to 8 m.

The pump 505a is located on the upstream side of the ink circulating path with respect to the head 502 and supplies the head 502 with the ink composition 520. Supplying the head 502 with the ink composition 520 and circulating the ink composition 520 in a circular path makes the ink composition 520 in the internal path 502c of the head 502 flow. This prevents any particulate component of the ink composition 520 from settling in the head 502 and aggregating.

When the ink composition contains an inorganic white pigment and an ink circulating path is provided, the ink composition may be discharged without returning through the ink outlet and circulating in the circulating path during ink jet recording, and some of the ink may be circulated even during ink jet recording. During a halt in ink jet recording, however, it is preferred to put a cap (not illustrated) on the nozzle openings and circulate the ink composition in the ink circulating path by using a pump. When the ink composition contains no inorganic white pigment, the ink delivery path may have no circulating mechanism or have a circulating mechanism that circulates the ink. It is also possible that the ink delivery path may have a circulating mechanism that does not circulate the ink.

Pump

Examples of means for delivering the non-aqueous light-curable ink composition include, but are not limited to, a pump (e.g., the pump 505a illustrated in FIG. 5). Examples of pumps include, but are not limited to, a tube pump, a gear pump, and a diaphragm pump. In particular, a tube pump is preferred. The use of a tube pump tends to reduce the cost, and also tends to suppress the increase in dissolved air content because no pressure is applied to the ink.

Warming Mechanism

It is preferred that the viscosity of the ink at discharge be 20 mPa·s or less, more preferably 15 mPa·s or less, from the viewpoint of ease in discharge. The viscosity of the ink at discharge has no specified lower limit. However, the lower limit is preferably 4 mPa·s or more. When the recording apparatus has a warming mechanism that warms the ink to reduce the viscosity of the ink, the viscosity of the ink may be equal to or less than the above ranges at the temperature of the warmed ink at discharge. When the recording apparatus has no warming mechanism that would warm the ink to reduce the viscosity of the ink, the viscosity of the ink may be equal to or less than the above ranges at room temperature, e.g., 20° C.

Initial Loading

When an empty ink delivery path is loaded with the ink prior to use of a recording apparatus (initial ink loading), e.g., when the ink delivery path is loaded with the ink for the first time or cleaned and then refilled with the ink, the ink may be drained from the head so that any large bubbles remaining in the ink delivery path or the head can be removed. It is preferred that the volume of the ink drained from the head in such a case be 50 mL or less, more preferably 30 mL or less, even more preferably 20 mL or less, so that ink loss can be reduced. The lower limit of the volume of such drained ink may be 0 mL (not drained). Furthermore, it is preferred that the volume drained from the head be equal to or less than the volume of the flow channel in the ink delivery path between the ink container and the head. When the ink delivery path has a circulating mechanism, this volume of the flow channel in the ink delivery path includes the volume of the return flow channel through which the ink is returned from the head. An aspect of the invention is particularly advantageous when the drained volume is equal to or lower than the above because in such a case the dissolved air content can increase because of fine bubbles left in the ink delivery path. Increase in the dissolve air content of the non-aqueous light-curable ink composition in a recording apparatus As mentioned above, the dissolved air content of the non-aqueous light-curable ink composition can increase in a recording apparatus. The difference between the dissolved air content of the non-aqueous light-curable ink composition at movement from the ink container to the ink delivery path (immediately before the movement) and the dissolved air content of the non-aqueous light-curable ink composition at delivery from the ink delivery path to the head (the latter minus the former) is preferably 20 ppm or less, more preferably 10 ppm or less, in particular 5 ppm or less, even more preferably 3 ppm or less. The above dissolved air content of the non-aqueous light-curable ink composition at movement from the ink container to the ink delivery path is, in other words, the dissolved air content of the non-aqueous light-curable ink composition stored in the ink container at recording.

In particular, it is preferred that the difference between the dissolved air content of the non-aqueous light-curable ink composition at movement from the ink tank to the ink delivery path and that the ink composition has while being delivered from the ink delivery path to the head 12 H (hours) later be in the above ranges. Making this difference fall within these ranges enhances the head discharge stability. This difference has no specified lower limit. The lower limit can be −20 ppm or more, and it is better that the lower limit be 0 ppm or more. From the viewpoint of accepting an increase in dissolved oxygen content without abandoning excellent head discharge stability as well as a reasonable freedom of design of the recording apparatus and low cost, it is preferred that the lower limit of this difference be 2 ppm or more, more preferably 5 ppm or more.

EXAMPLES

The following describes an aspect of the invention in more detail by providing examples and comparative examples. No aspect of the invention is limited to these examples.

Materials for Ink Compositions

The following is a list of some important materials used to prepare the ink compositions used in Examples and Comparative Examples below.

Coloring Materials
 C.I. Pigment White (PW6)
 C.I. Pigment Violet (PV19)
Radically-Polymerizable Compounds
 VEEA (2-(2-vinyloxyethoxy)ethyl acrylate, Nippon Shokubai Co., Ltd.)
 PEA (phenoxyethyl acrylate, OSAKA ORGANIC CHEMICAL INDUSTRY LTD.)
 DPGDA (dipropylene glycol diacrylate, Sartomer)
 2MTA (2-methoxyethyl acrylate, OSAKA ORGANIC CHEMICAL INDUSTRY LTD.)
Photopolymerization Initiators
 IRGACURE 819 (a trade name of a BASF product, 100% solids)
 DAROCURE TPO (a trade name of a BASF product, 100% solids)
 Speedcure DETX (a trade name of a Lambson product, 100% solids)
 IRGACURE 369 (a trade name of a BASF product, 100% solids)
Polymerization Inhibitor
 MEHQ (p-methoxyphenol)
Silicone Surfactants
 UV3500 (a trade name of a BYK Japan product)
 UV3700 (a trade name of a BYK Japan product)
 BYK350 (a trade name of a BYK Japan product)
 BYK381 (a trade name of a BYK Japan product)
Preparation of the Ink Compositions Ink compositions were prepared in the air by mixing materials in the proportions (% by mass) specified in Table 1 and thoroughly stirring the mixture. The resulting ink compositions were degassed using a vacuum pump, with the degassing time adjusted so that the ink compositions would be obtained with different dissolved oxygen content levels and different dissolved nitrogen content levels.

TABLE 1

| | Ink No. | 2 | 3 | 4 | 5 | 6 | 10 | 14 | 15 | 16 | 17 | 18 |
|---|---|---|---|---|---|---|---|---|---|---|---|---|
| Coloring materials | PW6 | 18.0 | 18.0 | 18.0 | 18.0 | 18.0 | 18.0 | 18.0 | | 18.0 | 18.0 | 18.0 |
| | PV19 | | | | | | | | 5.0 | | | |
| Radically-polymerizable compounds | VEEA | 50.0 | 50.0 | 50.0 | 50.0 | 50.0 | 50.0 | 50.0 | 50.0 | 30.0 | 10.0 | 50.0 |
| | PEA | 10.0 | 10.0 | 10.0 | 10.0 | 10.0 | 10.0 | 10.0 | 10.0 | 15.0 | 25.0 | 5.0 |
| | DPGDA | 11.6 | 11.6 | 11.6 | 11.6 | 11.6 | 11.6 | 11.6 | 24.6 | 26.6 | 36.6 | 3.0 |
| | 2MTA | | | | | | | | | | | 13.6 |
| Photo-polymerization initiators | IRGACURE 819 | 4.0 | 4.0 | 4.0 | 4.0 | 4.0 | 4.0 | 2.0 | 4.0 | 4.0 | 4.0 | 4.0 |
| | DAROCURE TPO | 4.0 | 4.0 | 4.0 | 4.0 | 4.0 | 4.0 | 2.0 | 4.0 | 4.0 | 4.0 | 4.0 |
| | Speedcure DETX | 2.0 | 2.0 | 2.0 | 2.0 | 2.0 | 2.0 | 1.0 | 2.0 | 2.0 | 2.0 | 2.0 |
| | IRGACURE 369 | | | | | | | 5.0 | | | | |
| Polymerization inhibitor | MEHQ | 0.2 | 0.2 | 0.2 | 0.2 | 0.2 | 0.2 | 0.2 | 0.2 | 0.2 | 0.2 | 0.2 |
| Surfactants | UV3500 | 0.2 | 0.2 | 0.2 | 0.2 | 0.2 | | 0.2 | 0.2 | 0.2 | 0.2 | 0.2 |
| | UV3700 | | | | | | 0.2 | | | | | |
| | BYK350 | | | | | | | | | | | |
| | BYK381 | | | | | | | | | | | |
| Surface tension [mN/m] | | 23 | 23 | 23 | 23 | 23 | 25 | 23 | 24 | 21 | 20 | 23 |
| Viscosity rank (20° C.) | | B | B | B | B | B | B | B | B | C | D | A |
| Dissolve air content of the ink composition stored in the ink container [ppm] | | 7 | 15 | 25 | 30 | 38 | 15 | 15 | 15 | 7 | 7 | 15 |
| Storage stability | | A2 | A1 | A1 | A1 | A1 | A1 | A1 | A1 | A2 | A2 | A1 |
| Dissolved air content stability | | A | A | A | B | B | — | — | — | — | — | — |

| | Ink No. | 1 | 7 | 8 | 9 | 11 | 12 | 13 |
|---|---|---|---|---|---|---|---|---|
| Coloring materials | PW6 | 18.0 | 18.0 | 18.0 | 18.0 | 18.0 | 18.0 | 18.0 |
| | PV19 | | | | | | | |
| Radically-polymerizable compounds | VEEA | 50.0 | 50.0 | 50.0 | 50.0 | 50.0 | 50.0 | 50.0 |
| | PEA | 10.0 | 10.0 | 10.0 | 10.0 | 10.0 | 10.0 | 10.0 |
| | DPGDA | 11.6 | 11.6 | 11.6 | 11.6 | 11.4 | 11.6 | 11.8 |
| | 2MTA | | | | | | | |
| Photo-polymerization initiators | IRGACURE 819 | 4.0 | 4.0 | 4.0 | 4.0 | 4.0 | 4.0 | 4.0 |
| | DAROCURE TPO | 4.0 | 4.0 | 4.0 | 4.0 | 4.0 | 4.0 | 4.0 |
| | Speedcure DETX | 2.0 | 2.0 | 2.0 | 2.0 | 2.0 | 2.0 | 2.0 |
| | IRGACURE 369 | | | | | | | |
| Polymerization inhibitor | MEHQ | 0.2 | 0.2 | 0.2 | 0.2 | 0.2 | 0.2 | 0.2 |
| Surfactants | UV3500 | 0.2 | | | | | | |
| | UV3700 | | | | | | | |
| | BYK350 | | | 0.2 | 0.2 | 0.2 | 0.4 | |
| | BYK381 | | | | | | | 0.2 |
| Surface tension [mN/m] | | 23 | 33 | 33 | 33 | 28 | 33 | 27 |
| Viscosity rank (20° C.) | | B | B | B | B | B | B | B |

TABLE 1-continued

| | | | | | | | |
|---|---|---|---|---|---|---|---|
| Dissolve air content of the ink composition stored in the ink container [ppm] | 5 | 5 | 15 | 38 | 15 | 15 | 15 |
| Storage stability | B | B | A1 | A1 | A1 | A1 | A1 |
| Dissolved air content stability | B | — | — | — | — | — | — |

Ink Jet Recording Apparatus

A modified SC-S30650 (Seiko Epson Corporation) (hereinafter referred to as "the modified printer") was used. The modifications were as follows: the circulating mechanism described below was provided; the head was provided with a warming mechanism by which the ink could be warmed (a heater); and the carriage was provided with a light source next to the head.

The circulating mechanism was prepared by providing the ink delivery path of the printer, i.e., the path between the ink container (ink cartridge) and the head, with a return way (a return flow channel) extending parallel to the outbound way of the ink delivery path from a point just after where the ink container was attached to a point just before the head so that the ink could circulate. A tube pump (WP1000, a tube pump manufactured by Welco) was provided to the outbound way. The flow rate of the ink composition in the ink delivery path (hereinafter referred to as "the ink flow rate") was controlled using the tube pump. The outbound way and the return way of the ink delivery path were made of silicone rubber and had a diameter (inner diameter) of 3 mm. The length of the ink delivery path between the ink container to the head (the outbound way) and the length of the return way were each approximately 3 m.

As for the head, head No. 1 and head No. 2 were prepared. Head No. 1 had a stepped portion, and the nozzles thereof were created by dry-etching a nozzle plate made of silicon. The nozzle pitch of head No. 1 was 360 dpi. The nozzle diameter was 20 μm at the outermost portion on the side of the nozzles where the ink composition was to be discharged.

Head No. 2 had no stepped portion, and the nozzle plate used therein was a stainless steel plate that had nozzles punched therethrough. Having no stepped portion, head No. 2 had an equal nozzle diameter on the surface on both sides of the nozzle plate where the ink composition was to flow in and be discharged. The nozzle pitch of head No. 2 was 180 dpi. However, the apparent nozzle pitch was 360 dpi because two rows of nozzles were arranged in such a manner that the nozzles in one row would be displaced by half the nozzle pitch in the direction of arrangement of the nozzles with respect to the nozzles in the other row (staggered arrangement). The nozzle diameter was 20 μm at the outermost portion on the side of the nozzles where the ink composition was to be discharged.

Surface Tension Measurement

The surface tension was measured by the Wilhelmy method using a surface tensiometer "CBVP-Z" manufactured by Kyowa Interface Science Co., Ltd. The following describes the Wilhelmy method. When a measuring unit (a platinum plate) makes contact with the surface of a liquid, the liquid wets the measuring unit upwards. The surface tension acts along the perimeter of the measuring unit to pull the measuring unit in the liquid. The pulling force is measured and used to determine the surface tension. The measurement was performed at room temperature and pressure. The temperature was, more specifically, 25° C.

Measurement of the Dissolved Air Content of the Non-Aqueous Light-Curable Ink Composition in the Ink Container As for the dissolved air content of the non-aqueous light-curable ink composition in the ink container, the prepared inks were stored in an ink container, and the dissolved air content thereof was determined by measuring the dissolved oxygen content and the dissolved air content using Agilent gas chromatograph "6890N" and then adding the two measurements together. The carrier gas was helium gas for each. The dissolved oxygen content and the dissolved nitrogen content of an ink composition are the volumes in ppm of oxygen (gas) and nitrogen (gas), respectively, dissolved in a given volume of the ink composition (liquid).

Ink Viscosity Rank

The viscosity of each ink composition at 20° C. was measured using a viscometer (the trade name MCR-300, manufactured by Physica), and the ink viscosity rank was determined using the criteria below. A cone (with a diameter of 75 mm and an angle of 1°) was used, and the rotational speed was 100 rpm.

A: Less than 8 mPa·s
B: 8 to 15 mPa·s
C: More than 15 to 25 mPa·s
D: More than 25 mPa·s Ink Storage Stability Evaluation Each ink composition was stored in an ink container and subjected to an accelerated study at 60° C. for 7 days. Then the ink viscosity at 20° C. was measured, and the percentage increase in viscosity (the ink viscosity at 20° C. after the accelerated study/the ink viscosity at 20° C. before the accelerated study×100) was determined and evaluated using the criteria below. The ink viscosity was measured by a method similar to the method used in "Ink viscosity rank" above.

Evaluation Criteria

A1: Less than 3%
A2: 3% to 5%
B: More than 5%

Evaluation of the Stability of the Dissolved Air Content of the Ink Upon Preparation Fifty liters of each ink composition was prepared, and the degassing time required to achieve the dissolved air content in Table 1 was determined by measuring the dissolved air content of the ink every 10 minutes of degassing time from the start of degassing and adding 10 minutes to the accumulated degassing time at which the dissolved air content in Table 1 was reached. The ink composition was prepared 10 times with the determined degassing time. A vacuum pump was used to degas the ink composition. This evaluation of the stability of dissolved air content was for the purpose of checking the stability of the dissolved air content during degassing upon ink preparation and conducted on ink Nos. 1 to 6, which had the same ink formula and different dissolved air content levels.

Evaluation Criteria

A: The dissolved air content of the prepared ink composition was equal to or less than the dissolved air content in Table 1 for all the 10 times.

B: The dissolved air content of the prepared ink composition was more than the dissolved air content in Table 1 at least once.

Ink Jet Recording Method

Initial Loading: Examples 1 to 12 and Comparative Examples 1 to 8

Ink containers (ink cartridges) were individually loaded with the ink compositions prepared as above, and the ink containers were each attached to the modified printer empty of the ink composition. Then the ink composition was delivered to the head by using a tube pump so that the modified printer would be loaded with the ink composition. Heads loaded with white ink compositions (ink Nos. 1 to 14 and 16 to 18) had an ink delivery path that had a circulating mechanism. A head loaded with a magenta ink composition (ink No. 15) had an ink delivery path that has no circulating mechanism (the return flow channel in FIG. 5 omitted). Initial loading included draining 10 mL of the ink composition from the head so that large bubbles that formed during loading could be eliminated. Initial loading was completed in this way, and the following evaluations were conducted immediately. The results are summarized in Table 2.

The ink compositions that ranked C or D in terms of ink viscosity were warmed with the heater provided to the head after initial loading and before the start of discharge so that the ink viscosity would be 10 mPa·s at discharge. The ink compositions that ranked A or B in terms of viscosity were discharged without warming.

Head Discharge Stability Evaluation

In the examples and comparative examples in which the ink flow rate was 6 m/min, the loaded modified printer was operated to continuously discharge the ink composition from the head at a discharge frequency of 12 kHz for 60 minutes. In Example 12, in which the ink flow rate was 4 m/min, the loaded modified printer was operated to continuously discharge the ink composition at a discharge frequency of 8 kHz for 60 minutes. The nozzles were checked for proper ejection every 5 minutes during the continuous discharge and at the completion of the continuous discharge. A nozzle was determined to be defective if at least one of the nozzle ejection checks found the nozzle to have failed to eject the ink composition. The number of defective nozzles was evaluated using the criteria below. The total number of nozzles of the head was 360.

The Number of Defective Nozzles

A1: 0 to 1
A2: 2 to 4
A3: 5 to 7
B: 8 to 15
C: 16 to 40
D: 41 or more

Head Discharge Stability (Early) Evaluation

In the above head discharge stability evaluation, the number of defective nozzles found in the nozzle check at 5 minutes after the start of the 60-minute continuous discharge was checked using the criteria below.

The Number of Defective Nozzles

A: No defective nozzles
B: One or more defective nozzles

Measurement of the Dissolved Air Content of the Non-Aqueous Light-Curable Ink Composition Discharged from the Head In Examples 1 to 12 and Comparative Examples 1 to 8, the non-aqueous light-curable ink composition was sampled at a point in the ink delivery path just short of the joint with the head at the completion of the above head discharge stability evaluation, and the dissolved air content of the ink was determined using Agilent gas chromatograph "6890N" as above.

Curability Evaluation

The loaded modified printer was operated to make the ink adhere to form a 720×720 dpi solid pattern (10 μm in thickness after curing). The recording medium was PET film (PET50A PL-Sin, Lintec Corporation). The ink was irradiated with 20 mJ/cm$^2$ of ultraviolet radiation in each single pass during adhesion, and the ink was also irradiated after adhesion. Curability was evaluated on the basis of the total irradiation energy required to cure this ink coating by using the evaluation criteria below. The ink was irradiated with ultraviolet radiation having a peak wavelength of 395 nm at a dose of 800 mW/cm$^2$. The coating left after the completion of curing (cured coating) was rubbed with a cotton swab 15 times with a load of 90 g applied, and the curing energy (irradiation energy) at which the cured coating was intact was determined. The irradiation energy [mJ/cm$^2$] was determined from the product of the irradiation dose [mW/cm$^2$] measured on the surface of the subject irradiated by the light source and the duration of irradiation [s]. The irradiation dose was measured using UM-10 ultraviolet radiometer and UM-400 receptor head (both manufactured by KONICA MINOLTA SENSING, INC.). Curability was evaluated using the evaluation criteria below.

Evaluation Criteria

A: 200 mJ/cm$^2$ or less
B: More than 200 mJ/cm$^2$ to 300 mJ/cm$^2$
C: More than 300 mJ/cm$^2$ Evaluation of Creasing During Curing The cured coating produced in the above curability evaluation was observed and evaluated using the evaluation criteria below.

Evaluation Criteria

A: Even observation with a magnifying glass found no irregularities on the surface of the cured coating.
B: Visual observation found no irregularities on the surface of the cured coating. However, observation with a magnifying glass found irregularities on the surface of the cured coating.
C: Even visual observation found irregularities on the surface of the cured coating.

Examples 13 to 16 and Comparative Examples 9 to 11

The ink composition was assessed as in the above evaluations after being left for 12 hours after the completion of initial loading. In the examples and comparative examples in which the ink composition contained a white pigment as coloring material, the ink was circulated by a circulating mechanism at a rate of 6 m/min while being left. The results are summarized in Table 3. In these examples and comparative examples, the dissolved air content in the table is a value obtained by measuring the dissolved air content of a sample of the non-aqueous light-curable ink composition taken at a point in the ink delivery path just short of the joint with the head after the ink composition was left for 12 H (before the start of discharge stability evaluation).

Reference Examples 1 and 2

One thousand milliliters of the ink composition was drained from the head after the completion of initial loading. When the ink container was close to being out of ink, the ink container was replaced before being out of ink with a new one prepared under the same conditions. The ink composition was left for 12 hours after drainage and then assessed as in the above evaluations. While being left, the ink was circulated by a circulating mechanism at a rate of 6 m/min. The results are summarized in Table 3. In the reference examples, the dissolved air content in the table is a value obtained by measuring the dissolved air content of a sample of the non-aqueous light-curable ink composition taken at a point in the ink delivery path just short of the joint with the head after the ink composition was left for 12 H (before the start of discharge stability evaluation).

image is to be recorded, however, a low flow rate of ink may cause the head to be short of ink because much ink is needed. It was therefore shown that an aspect of the invention is particularly advantageous in that it allows the user to record images in a stable manner even when the flow rate of the ink is fast and much ink is required.

Discharge stability was enhanced with decreasing viscosity of the ink (comparison among Example 1, Example 8, and Example 9). A low viscosity of ink, however, also tended to cause considerable creasing during curing (Example 10). It was therefore demonstrated that making the

TABLE 2

| | Examples | | | | | | | | | | | | Comparative Examples | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 | 4 | 5 | 6 | 7 | 8 |
| Ink No. | 2 | 3 | 4 | 5 | 10 | 14 | 15 | 16 | 17 | 18 | 3 | 3 | 1 | 6 | 7 | 8 | 9 | 11 | 12 | 13 |
| Dissolved air content of the ink composition discharged from the head [ppm] | 7 | 15 | 25 | 30 | 15 | 15 | 15 | 7 | 7 | 15 | 15 | 15 | 5 | 38 | 5 | 15 | 38 | 15 | 15 | 15 |
| Head No. | 1 | 1 | 1 | 1 | 1 | 1 | 1 | 1 | 1 | 1 | 2 | 1 | 1 | 1 | 1 | 1 | 1 | 1 | 1 | 1 |
| Ink flow rate (m/min) | 6 | 6 | 6 | 6 | 6 | 6 | 6 | 6 | 6 | 6 | 6 | 4 | 6 | 6 | 6 | 6 | 6 | 6 | 6 | 6 |
| Head discharge stability | A1 | A2 | A2 | A3 | A2 | A1 | A1 | A2 | A3 | A1 | A1 | A1 | A1 | B | B | C | D | C | C | C |
| Head discharge stability (early) | B | B | B | B | B | B | B | B | B | B | A | B | B | B | B | B | B | B | B | B |
| Curability | A | A | A | A | A | C | A | A | B | A | A | A | A | B | A | A | B | A | A | A |
| Creasing during curing | B | B | B | B | B | B | B | B | A | C | B | B | B | B | B | B | B | B | B | B |

TABLE 3

| | Examples | | | | Comparative Examples | | | Reference Example | Reference Example |
|---|---|---|---|---|---|---|---|---|---|
| | 13 | 14 | 15 | 16 | 9 | 10 | 11 | 1 | 2 |
| Ink No. | 2 | 3 | 4 | 15 | 7 | 8 | 9 | 3 | 8 |
| Dissolved air content of the ink composition discharged from the head [ppm] | 15 | 21 | 30 | 17 | 45 | 45 | 45 | 21 | 22 |
| Head No. | 1 | 1 | 1 | 1 | 1 | 1 | 1 | 1 | 1 |
| Ink flow rate (m/min) | 6 | 6 | 6 | 6 | 6 | 6 | 6 | 6 | 6 |
| Head discharge stability | A2 | A2 | A3 | A1 | D | D | D | A2 | A2 |
| Head discharge stability (early) | B | B | B | B | B | B | B | B | B |
| Curability | A | A | B | A | A | A | B | A | A |
| Creasing during curing | B | B | B | B | B | B | B | B | B |

As can be seen from the tables, the ink jet recording method according to an aspect of the invention achieved excellent discharge stability.

Examples 1 to 4 showed that discharge stability is enhanced with decreasing dissolved air content of the discharged ink.

Example 7, in which the quantity of pigment in the ink was small, tended to achieve better discharge stability than that of other examples. When the quantity of pigment in the ink was large as in Example 2, however, discharge stability was somewhat low, although the produced recordings were of high masking properties. In such examples, an aspect of the invention was particularly advantageous.

Head No. 1 (e.g., Example 2), which had a stepped portion, was provided with nozzles that have some advantages, such as ease of increasing the nozzle pitch. However, head No. 1 tended to cause low discharge stability compared to head No. 2 (Example 11), which had no stepped portion. An aspect of the invention was therefore found to be particularly advantageous to head No. 1.

When the flow rate of the ink was slow (Example 12), discharge stability was slightly better than when the flow rate of the ink was faster (Example 2). When a dark-colored image is to be recorded, however, a low flow rate of ink may cause the head to be short of ink because much ink is needed.

viscosity of ink fall within a certain range enhances discharge stability and further reduces creasing during curing.

In an example in which the ink contained large quantities of acylphosphine oxide and thioxanthone compounds as photopolymerization initiators (Example 2), discharge stability was slightly worse than in Example 6, in which the quantity of these initiators was small, but curability was better than in Example 6. It was therefore indicated that an aspect of the invention is particularly advantageous when the ink contains either an acylphosphine oxide compound or a thioxanthone compound as a photopolymerization initiator.

When the dissolved air content of the ink composition discharged from the head was high as in Comparative Example 2, discharge stability was low, and curability was also somewhat low. Furthermore, when the surface tension was higher than 25 mN/m as in Comparative Example 3, discharge stability was poor despite the low dissolved air content of the ink composition discharged from the head.

The results of the evaluation conducted 12 hours after initial loading revealed that the ink compositions that had a surface tension less than a certain threshold experienced a slight increase in dissolved air content while being left for 12 hours (e.g., Example 13). The ink compositions that had a surface tension more than a certain threshold all experienced a significant increase in dissolved air content (e.g., Comparative Example 7). In Example 16, in which a magenta ink was used, the increase in dissolved air content was smaller than in Example 14, in which a white ink was used. This is presumably because the total length of the ink flow channel was short.

Furthermore, the results of the evaluation carried out 12 hours after 1000 mL of the ink composition was drained from the head during initial loading indicate that draining a relatively large volume of the ink composition during initial loading increased the dissolved oxygen content and the dissolved nitrogen content equally in Reference Example 1, in which a low-surface-tension ink composition (ink No. 3) was used, and in Reference Example 2, in which a high-surface-tension ink composition (ink No. 8) was used. This is presumably because draining a relatively large volume of the ink composition during initial loading reduced fine bubbles adhering to and remaining in the ink delivery path.

These results revealed that from the viewpoint of preventing the dissolved air content of ink from increasing in a recording apparatus after the recording apparatus is loaded with the ink, it is preferred to reduce the dissolved air content of the ink stored in the ink container and reduce the surface tension of the ink. In Example 2, the dissolved air content of a sample of the ink taken at a point in the ink delivery path just short of the joint with the head at the completion of initial loading (before the discharge stability evaluation) was 15 ppm, unchanged from the dissolved air content of the ink in the ink container.

An evaluation conducted as in Example 13 except that the pump provided to the ink delivery path was a diaphragm pump (the trade name LK, manufactured by Iwaki) instead of a tube pump determined the dissolved air content to be 19 ppm. It was therefore found that a tube pump is preferred from the viewpoint of reducing the increase in the dissolved oxygen content of the ink in the ink delivery path.

The entire disclosure of Japanese Patent Application No.:2013-071599, filed Mar. 29, 2013 and 2013-100997, filed May 13, 2013 and 2013-169299, filed Aug. 17, 2013 are expressly incorporated by reference herein.

What is claimed is:

1. An ink jet recording method using an ink jet recording apparatus having an ink container, a head, and an ink delivery path comprising:
    delivering a non-aqueous light-curable ink composition stored in the ink container to the head via the ink delivery path; and
    discharging the non-aqueous light-curable ink composition from the head toward a recording medium,
    the non-aqueous light-curable ink composition containing a radically-polymerizable compound and having a surface tension of 25 mN/m or less,
    the non-aqueous light-curable ink composition stored in the ink container having a dissolved air content of 7 ppm or more, and
    the non-aqueous light-curable ink composition having a dissolved air content of 30 ppm or less at delivery from the ink delivery path to the head,
    and wherein a difference between the dissolved air content of the non-aqueous light-curable ink composition at delivery from the ink delivery path to the head 12 hours after movement of the ink composition from the ink container to the ink delivery path and the dissolved air content of the non-aqueous light-curable ink composition stored in the ink container is 10 ppm or less.

2. The ink jet recording method according to claim 1, wherein the non-aqueous light-curable ink composition further contains at least one photopolymerization initiator selected from the group consisting of a thioxanthone compound and an acylphosphine oxide compound.

3. An ink jet recording apparatus configured to perform recording by the ink jet recording method according to claim 2.

4. The ink jet recording method according to claim 1, wherein the head has a pressure chamber configured to apply pressure to the non-aqueous light-curable ink composition and a stepped portion downstream of the pressure chamber.

5. An ink jet recording apparatus configured to perform recording by the ink jet recording method according to claim 4.

6. The ink jet recording method according to claim 1, wherein:
    the dissolved air content of the non-aqueous light-curable ink composition stored in the ink container is in a range of 7 to 25 ppm; and
    the dissolved air content of the non-aqueous light-curable ink composition at delivery from the ink delivery path to the head is in a range of 7 to 30 ppm.

7. An ink jet recording apparatus configured to perform recording by the ink jet recording method according to claim 6.

8. The ink jet recording method according to claim 1, wherein a viscosity of the non-aqueous light-curable ink composition at 20° C. is in a range of 8 to 40 mPa·s.

9. An ink jet recording apparatus configured to perform recording by the ink jet recording method according to claim 8.

10. The ink jet recording method according to claim 1, wherein the non-aqueous light-curable ink composition contains an inorganic white pigment.

11. An ink jet recording apparatus configured to perform recording by the ink jet recording method according to claim 10.

12. The ink jet recording method according to claim 1, wherein a flow rate of the non-aqueous light-curable ink composition in the ink delivery path is 5 m/min or more at delivery of the non-aqueous light-curable ink composition stored in the ink container to the head via the ink delivery path.

13. An ink jet recording apparatus configured to perform recording by the ink jet recording method according to claim 12.

14. The ink jet recording method according to claim 1, wherein the ink delivery path has no degassing mechanism.

15. An ink jet recording apparatus configured to perform recording by the ink jet recording method according to claim 14.

16. The ink jet recording method according to claim 1, wherein the ink delivery path has a circulating mechanism.

17. The ink jet recording method according to claim 1, wherein a tube pump is used to deliver the non-aqueous light-curable ink composition to the head.

18. The ink jet recording method according to claim 1, wherein when initial loading of the ink delivery path is carried out with ink, a volume of the ink drained from the head during the initial loading is 50 mL or less.

19. The ink jet recording method according to claim 1, further comprising delivering the non-aqueous light-curable ink composition from the ink delivery path to the head 12 hours or more after movement of the ink from the ink container to the ink delivery path.

20. An ink jet recording apparatus configured to perform recording by the ink jet recording method according to claim 1.

* * * * *